United States Patent
Hager et al.

(10) Patent No.: US 7,075,478 B2
(45) Date of Patent: Jul. 11, 2006

(54) RADAR ALTIMETER HAVING AN AUTOMATICALLY CALIBRATED SENSITIVITY RANGE CONTROL FUNCTION

(75) Inventors: James R. Hager, Golden Valley, MN (US); Mark S. Shoemaker, Plymouth, MN (US); Thomas J. Jorgensen, Bloomington, MN (US)

(73) Assignee: Honeywell International Inc., Morristown, NJ (US)

(*) Notice: Subject to any disclaimer, the term of this patent is extended or adjusted under 35 U.S.C. 154(b) by 206 days.

(21) Appl. No.: 10/862,511

(22) Filed: Jun. 7, 2004

(65) Prior Publication Data

US 2005/0270226 A1   Dec. 8, 2005

(51) Int. Cl.
*G01S 13/08* (2006.01)
(52) U.S. Cl. ............................ 342/120; 342/91; 342/92; 342/198
(58) Field of Classification Search ........ 342/120–122, 342/89–93, 174, 195, 198
See application file for complete search history.

(56) References Cited

U.S. PATENT DOCUMENTS

| | | | |
|---|---|---|---|
| 2,991,468 A * | 7/1961 | Post ............................. 342/205 |
| 3,242,488 A * | 3/1966 | Leyde et al. ................... 342/92 |
| 4,232,313 A | 11/1980 | Fleishman |
| 4,940,987 A | 7/1990 | Frederick |
| 5,150,125 A | 9/1992 | Hager |
| 5,160,933 A | 11/1992 | Hager |
| 5,202,690 A | 4/1993 | Frederick |
| 5,477,226 A | 12/1995 | Hager et al. |
| 5,719,582 A | 2/1998 | Gray |
| 5,884,223 A | 3/1999 | Tognazzini |
| 5,898,680 A | 4/1999 | Johnstone et al. |
| 6,025,800 A | 2/2000 | Hager |
| 6,362,776 B1 | 3/2002 | Hager et al. |
| 6,407,697 B1 | 6/2002 | Hager et al. |
| 6,564,146 B1 | 5/2003 | Meyer et al. |
| 6,753,806 B1 * | 6/2004 | Hager et al. ................. 342/169 |
| 2005/0270226 A1 * | 12/2005 | Hager et al. ................. 342/120 |

* cited by examiner

*Primary Examiner*—John B. Sotomayor
(74) *Attorney, Agent, or Firm*—Dina Khaled, Esq.; Armstrong Teasdale LLP

(57) ABSTRACT

A radar altimeter for an air vehicle is described. The radar altimeter includes a transmit antenna configured to transmit radar signals toward the ground, a receive antenna configured to receive radar signals reflected from the ground, the receive antenna also receiving signals propagated along a leakage path from the transmit antenna, and a receiver configured to receive signals from the receive antenna. The radar altimeter also includes at least one altitude processing channel configured to receive signals from the receiver to determine an altitude, and an automatic sensitivity-range-control (SRC) channel configured to receive signals from the receiver. The SRC channel is configured to determine an amplitude of the received leakage path signals when an altitude of the radar altimeter is sufficient to separate received signals reflected from the ground from signals received from the leakage path.

32 Claims, 2 Drawing Sheets

RADAR ALTIMETER HAVING AN AUTOMATICALLY CALIBRATED SENSITIVITY RANGE CONTROL FUNCTION

BACKGROUND OF THE INVENTION

This invention relates generally to radar altimeter operations and more specifically, to a radar altimeter which includes an automatically calibrated sensitivity range control (SRC) function.

A radar altimeter typically includes a transmitter for applying pulses of electromagnetic energy, at a radio frequency (RF), and at regular intervals to a transmit antenna which then radiates the energy, in the form of a transmit beam, towards the earth's surface. A transmit beam from a radar is sometimes said to "illuminate" an area (e.g. the ground) which reflects (returns) the transmit beam. The reflected beam, sometimes referred to as a ground return, is received at a receive antenna of the radar altimeter. A signal from the receive antenna is processed to determine an altitude of the aircraft incorporating the radar altimeter.

However, radar altimeters typically provide marginal performance at very low altitudes, for example, during landing and take-off. During landing and take-off is when accurate operation of radar altimeters is most desired, at least in part, due to the proximity of the aircraft to the ground. The reduction in performance is partially due to interfering signals resulting from a leakage path between the transmit and receive antennas of the radar altimeter. In normal radar altimeter operations, as described above, a transmit antenna transmits a signal towards the ground which reflects the signal. The receive antenna receives the ground reflected signal for processing to determine aircraft altitude. A leakage path exists when a portion of the transmitted signal is directly received by the receive antenna without having been reflected by the ground.

Aircraft radar altimeter installations utilize separate transmit and receive antennas to enable a tracking of altitude down to a zero altitude. As described above, the ground return signal at low altitudes, for example, during landing and take-off operations, is difficult to process. The difficulty is partially caused by the leakage path signals. At low altitudes, the ground return signal corresponding to a transmitted signal is received, at a close proximity in time, to reception of the leakage path signal resulting from the same transmission. To counteract the leakage path signals, a gain of the receiver of the radar altimeter is typically decreased at low altitudes. Lowering the gain allows the radar altimeter to acquire the desired ground return signals rather than the leakage path signals. The gain is typically decreased as a function of decreasing altitude and this function is commonly referred to as sensitivity-range-control (SRC). Utilizing SRC, the gain of the radar altimeter receiver is reduced to a level to assure the receiver will not acquire and track the leakage path signals. As described, SRC is an open loop control, and a significant desensitization margin is added to SRC, typically greater than 10 decibels, to allow for antenna installation variances and radar altimeter receiver sensitivity variances.

During production, and as part of incorporating a sensitivity-range-control, known radar altimeters are calibrated for each different aircraft antenna installation. Further, these radar altimeters are temperature compensated to assure that sensitivity of the radar altimeter is lower than an expected antenna leakage signal, but also to retain as high of a sensitivity as possible to provide the best possible low altitude performance. Still further, the significant desensitization margin described above (e.g., 10 dB), is incorporated into radar altimeters to allow for leakage path signal amplitude variances. Such variances are caused by, for example, transmit and receive antenna separation distance variations, or variations in landing gear or munitions positions in the vicinity of the leakage path.

BRIEF SUMMARY OF THE INVENTION

In one aspect, a radar altimeter for an air vehicle is provided. The radar altimeter comprises a transmit antenna configured to transmit radar signals toward the ground and a receive antenna configured to receive radar signals reflected from the ground. The receive antenna also receives signals propagated along a leakage path from the transmit antenna. The radar altimeter also comprises a receiver configured to receive signals from the receive antenna, at least one altitude processing channel configured to receive signals from the receiver to determine an altitude, and an automatic sensitivity-range-control (SRC) channel configured to receive signals from the receiver. The SRC channel is configured to determine an amplitude of the received leakage path signals when an altitude of the radar altimeter is sufficient to separate received signals reflected from the ground from signals received from the leakage path.

In another aspect, a method for processing signals received by a radar altimeter is provided. The method comprises receiving a radar signal reflected by the ground indicative of an altitude, receiving a leakage signal from a transmit antenna of the radar altimeter, and sensing an amplitude of the received leakage signals when an altitude determined by the radar altimeter is sufficient to separate received signals reflected from the ground from received leakage path signals.

In still another aspect, an automatic sensitivity-range-control (SRC) circuit for a radar altimeter is provided which is configured to receive signals from a receiver of the radar altimeter. The SRC circuit is configured to sense an amplitude of signals propagated along a leakage path between transmit and receive antennas of the radar altimeter when an altitude is determined to be sufficient to separate received signals reflected from the ground from signals received from the leakage path.

DETAILED DESCRIPTION OF THE INVENTION

Figure 1:
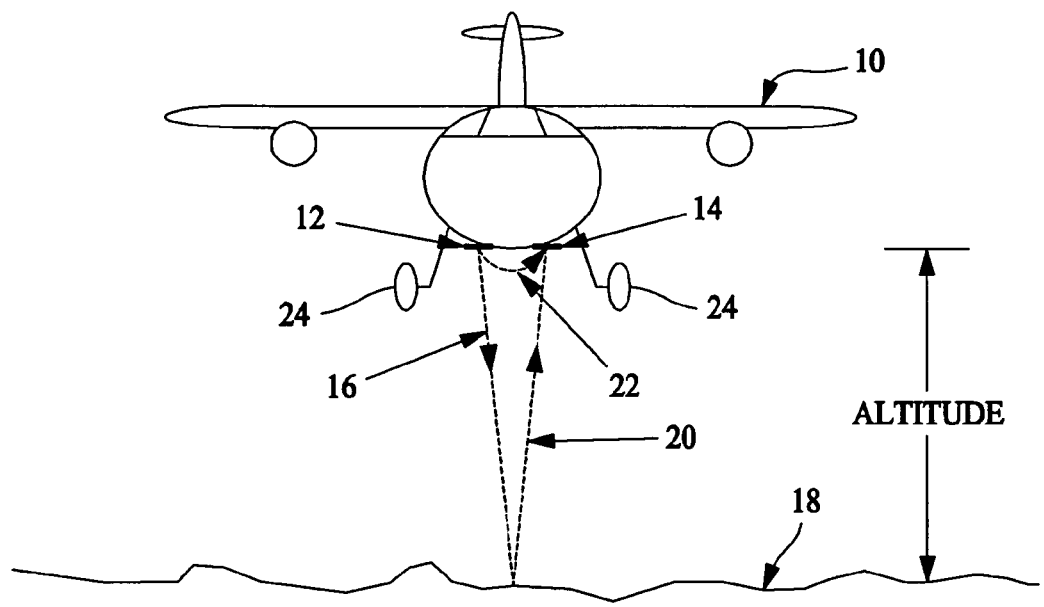
FIG. 1 is a diagram illustrating radar altimeter transmissions and returns with respect to an aircraft.

FIG. 1 is a diagram illustrating radar altimeter transmissions and returns with respect to an aircraft 10. Aircraft 10 is configured with a radar altimeter (not shown) which includes a transmit antenna 12 and a receive antenna 14 which are separated by a distance across a portion of the fuselage of aircraft 10. For radar altimeter operation, a transmit beam 16 is transmitted by transmit antenna 12, reflected by ground 18 (sometimes referred to as a terrain), and reflected beam 20 is received at receive antenna 14 for processing. A time between transmission from transmit antenna 12 to reception by receive antenna 14 is directly proportional to an altitude above ground 18. As described above, a leakage path 22 exists between transmit antenna 12 and receive antenna 14. A number of factors contribute to the characteristics of leakage path 22, some of which are described above. With reference to FIG. 1, a location of landing gears 24 with respect to transmit antenna 12 and receive antenna 14 is illustrated. In one example and as illustrated, placement of landing gears 24 dictates placement of transmit antenna 12 and receive antenna 14, perhaps resulting in a shortened leakage path 22. In other installations, landing gears 24 may affect radar altimeter transmissions and receptions electrically. Still referring to FIG. 1, it is seen that as an altitude of aircraft 10 decreases, the combined distance of transmit beam 16 and reflected beam 20 will approach that of the distance of leakage path 22, which in part results in the radar altimeter processing difficulties at low altitudes described in detail above.

Figure 2:
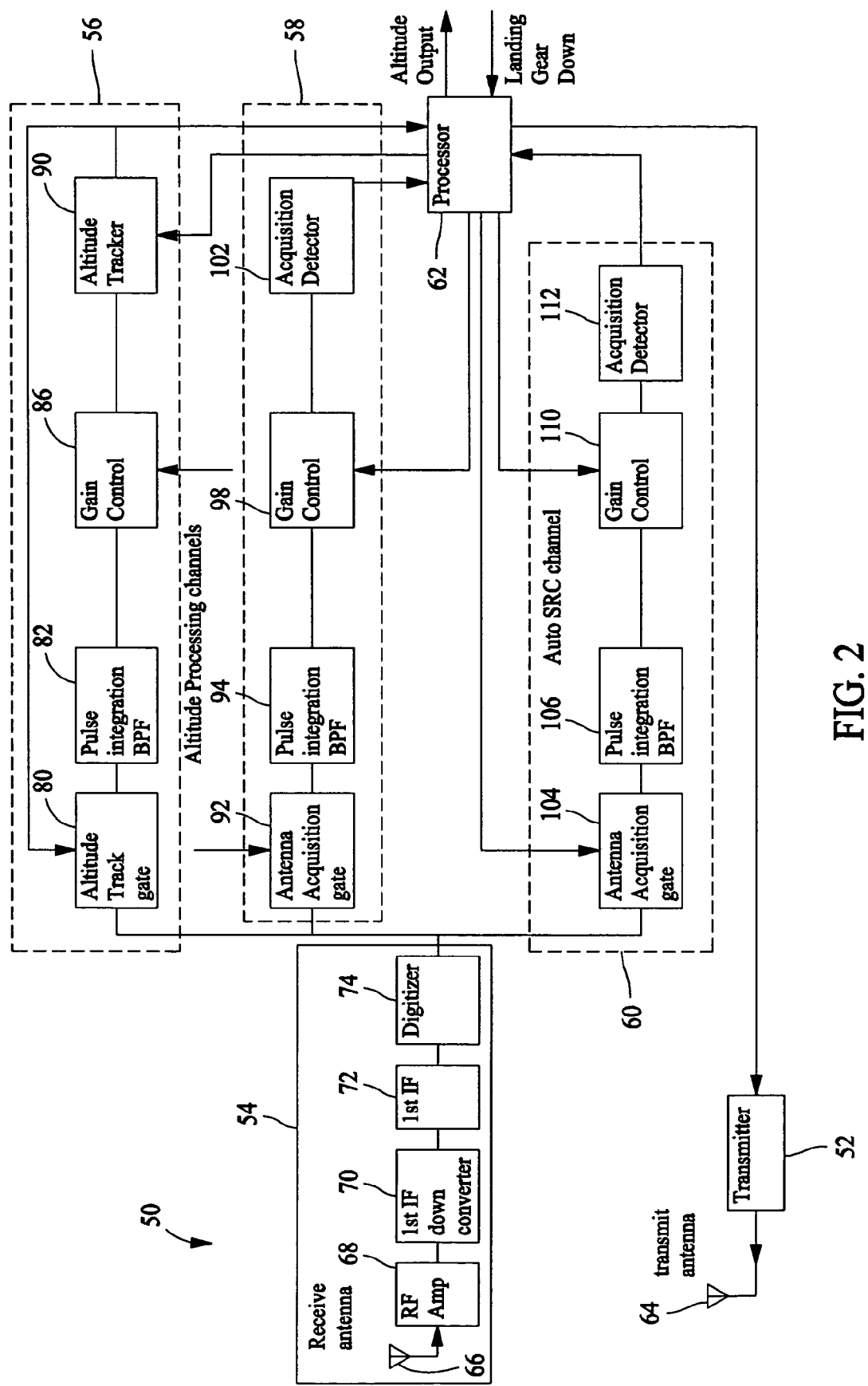
FIG. 2 is a block diagram of a radar altimeter including an automatically calibrated sensitivity range control channel.

FIG. 2 is a block diagram illustrating one embodiment of a radar altimeter 50 configured to be incorporated in an air vehicle, for example, aircraft 10 (shown in FIG. 1) which incorporates an automatically calibrated sensitivity range control (SRC). Radar altimeter 50 includes a transmitter 52, a receiver section 54, altitude processing channels 56 and 58, an automatic SRC channel 60, and a processor 62.

Transmitter 52 transmits pulses of RF energy (e.g., radar signals) through transmit antenna 64. Receive antenna 66 receives radar signals reflected from ground 18 and via leakage path 22. The received radar signals are amplified by RF amplifier 68 and mixed down to an intermediate frequency by first IF down converter 70, and further amplified and band limited by first IF amplifier-filter 72. Digitizer 74 digitizes the received signal from first IF amplifier-filter 72 and outputs the digitized samples to altitude processing channels 56 and 58 and automatic SRC channel 60. As utilized herein with respect to altitude processing channels 56 and 58, and automatic SRC channel 60, the term channel describes a signal processing function receiving digitized samples from digitizer 74 and processing the digitized signals to provide a particular result, for example, altitude tracking.

Altitude processing channel 56 includes an altitude tracking gate 80, a pulse integration band pass filter (BPF) 82, gain control 86, and an altitude tracker 90. Altitude processing channel 58 includes an altitude acquisition gate 92, a pulse integration BPF 94, gain control 98, and an acquisition detector 102. Automatic SRC channel 60 includes an antenna acquisition gate 104, a pulse integration BPF 106, a gain control 110, and an acquisition detector 112.

Radar range is determined by measuring an amount of time it takes for a radar pulse to travel from transmit antenna 66 to ground 18, reflect off ground 18, and return to receive antenna 64 as a radar return signal. Altitude track gate 80 and altitude acquisition gate 92 are essentially switches that only allow selected samples of the radar return signal to be processed. In some contexts, a "gate" implies a switch that may be closed for a finite length of time during the gating interval, but in the digital signal processing context, gates correspond to discrete samples taken within the gating interval. The return signal can not get through the gate until the point in time at which the switch is closed. For example, if a radar gate is set to a range of 1000 feet, the gate will wait two microseconds (which is the amount of time corresponding to radar signals traveling about 2000 feet or a radar range of about 1000 feet) after transmission, and then close to allow the sampled return signal to pass through. The time the switch is closed is referred to as the gate width. Processor 62 sets the gating interval and gate width of gates 80 and 92 in altimeter 50.

Radar altimeter 50 as described addresses the problems associated with leakage paths 22 at low altitudes through incorporation of automatic SRC channel 60. Automatic SRC channel 60 is a separate processing channel within radar altimeter 50 and is utilized to sense an amplitude of signals on leakage path 22 (shown in FIG. 1) during normal operation of radar altimeter 50. Specifically, a gain of automatic SRC channel 60 is automatically set such that an amplitude of a leakage path signal processed by automatic SRC channel 60 is held below an acquisition threshold of acquisition detector 112. In one embodiment, gain of automatic SRC channel 60 is set when an altitude of aircraft 10 is greater than a maximum range delay (altitude calculation) that would result by processing the signal on leakage path 22 as a ground return. An example of such an altitude is above twenty feet, which is sufficient to separate (in time) the ground return from signals on leakage path 22. In one embodiment, the gain of automatic SRC channel 60 is set only when landing gear 24 is down so as to include its affect on a sensed amplitude of signals on leakage path 22. The resulting closed loop SRC function of automatic SRC channel 60 does not require production calibration, and reduces the desensitization margin between ground returns and signals from leakage path 22 from over 10 dB to typically about 2 dB, resulting in over 8 dB greater low altitude altimeter sensitivity.

Still referring to FIG. 2, radar altimeter 50 is a normal pulse coherent radar altimeter, with automatic SRC channel 60 added to radar altimeter 50. In one embodiment, altitude processing channel 58 is configured as an acquisition channel which is programmed to move altitude acquisition gate 92 out in range, or in time to find the altitude return (e.g., ground return 20 (shown in FIG. 1)). When altitude acquisition gate 92 is searching for ground returns 20 in a low altitude region, antenna leakage (e.g., signals) from leakage path 22 may be present and can interfere with ground return 20 processing. To counteract such interference, a gain is set by gain control 98 to reduce gain of altitude processing channel 58 to a level that is dependent on the search range. Such dependency, in one embodiment, controlled by an altitude versus gain table in a memory of processor 62. The resulting gain assures that altitude processing channel 58 does not acquire signals from leakage path 22, while still searching with a gain at least 8 dB greater than the above described open loop SRC control methods.

The altitude versus gain table is also accessed by automatic SRC channel 60, and is continuously updated when the altitude is greater than, for example, twenty feet to assure no interference from the altitude return. In another embodiment the updates occur when landing gear 24 is down in order to include its affect in the altitude versus gain table. Antenna acquisition gate 104 is controlled by processor 62 to duplicate a width and a movement of altitude acquisition gate 92 during the altitude search function.

Figure 3:
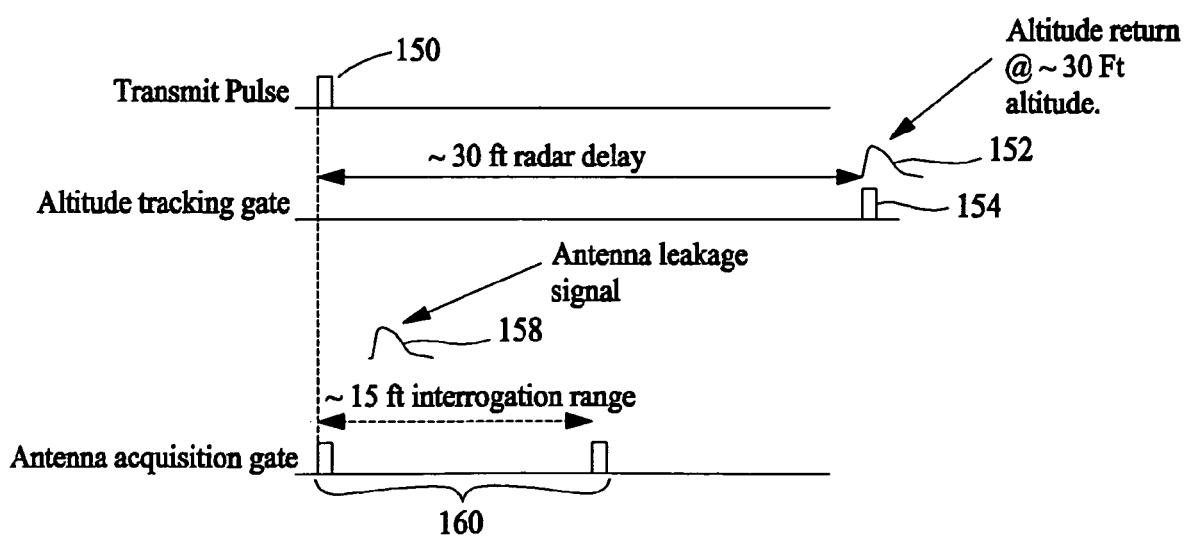
FIG. 3 is a radar altimeter timing diagram.

FIG. 3 is a timing illustration of the altitude and leakage signals described above. With respect to altitude processing, a transmit pulse 150 is transmitted, and a return pulse 152 is received, after a delay that is based on an altitude of aircraft 10.

In the example of FIG. 3, it is assumed the aircraft is at an altitude of 30 feet, and the return pulse 152 is received after a 30 foot radar delay (approximately 60 nanoseconds). A 30 foot radar delay it the time it takes for a transmitted radar pulse to travel to a target 30 feet away, reflect off the target, and travel the approximately 30 feet back to a receive antenna. Therefore, a 30 foot radar delay is the time it takes a radar pulse to travel approximately 60 feet. The timing of altitude tracking gate 154 is illustrated as being aligned with return pulse 152, illustrating a correct setting of altitude tracking gate 80 (shown in FIG. 2).

Antenna leakage signal 158 is received a short time after transmission of transmit pulse 150, the delay time being dependent on a spacing between transmit and receive antennas, landing gear placement, munitions mounted on aircraft 10, a length of time of transmit pulse 150, and antenna cable lengths. FIG. 3 illustrates a fifteen foot antenna leakage path interrogation range 160 over which the antenna acquisition gate 104 attempts to acquire signals from leakage path 22. The fifteen foot example is one example of a maximum antenna leakage/landing gear radar range delay. In certain applications, while the transmit and receive antennas may be only one foot apart in radar range, the length of time of a radar transmit pulse effectively adds to the antenna leakage radar range delay caused by the antenna spacing. Specifically, for the fifteen foot example maximum radar range delay, one foot may be due to the antenna spacing, ten feet due to a ten nanosecond transmit pulse, and an additional four nanoseconds of signal ringing after transmission of the pulse. It is to be understood the above described radar range delay is by way of example only and should not be construed as limiting.

During alternate interrogation range searches, processor 62 (shown in FIG. 2) is programmed to effectively dither gain control 110 of automatic SRC channel 60 to find a maximum gain limit which does not result in acquisition of signals from leakage path 22. At each gate position for antenna acquisition gate 104, from zero feet out to the fifteen foot example maximum, a maximum gain value for gain control 110 is determined and stored in the altitude versus gain table in a memory of processor 62. The altitude versus gain table is continuously updated whenever landing gear 24 gear is down, and the altitude is greater than, for example, twenty feet. In one embodiment, the altitude versus gain table is stored in a non-volatile memory type. At start up, the table is adjusted to a lower gain to allow for temperature differences, or weapon changes since the last flight. During the first take-off, the altitude versus gain table is updated to the optimized values for the present aircraft configuration.

The methods and apparatus described above facilitate automatically overcoming a possibility that radar altimeters will attempt to process signals received from leakage path 22 as ground return signals 20. As described above, aircraft radar altimeter installations utilize separate transmit and receive antennas to enable a tracking of altitude down to a zero altitude. The above described methods and apparatus provide a solution for the processing of ground return signals at low altitudes, for example, during landing and take-off operations, while controlling gain of received signals from leakage path to prevent their acquisition. To counteract the leakage, a gain of the receiver of the radar altimeter is typically decreased at low altitudes where the ground return is received, at a close proximity in time, to reception of the antenna leakage signal to keep from acquiring the leakage signal instead of the desired ground return. With the automatic sensitivity-range-control (SRC), the gain of the radar altimeter receiver is reduced to a level to assure the receiver will not acquire and track signals propagated along antenna leakage paths as ground return signals.

While the invention has been described in terms of various specific embodiments, those skilled in the art will recognize that the invention can be practiced with modification within the spirit and scope of the claims.

What is claimed is:

1. A radar altimeter for an air vehicle comprising:
    a transmit antenna configured to transmit radar signals toward the ground;
    a receive antenna configured to receive radar signals reflected from the ground, said receive antenna also receiving signals propagated along a leakage path from said transmit antenna;
    a receiver configured to receive signals from said receive antenna;
    at least one altitude processing channel configured to receive signals from said receiver to determine an altitude; and
    an automatic sensitivity-range-control (SRC) channel configured to receive signals from said receiver, said SRC channel configured to determine an amplitude of the received leakage path signals when an altitude of said radar altimeter is sufficient to separate received signals reflected from the ground from signals received from the leakage path.

2. A radar altimeter according to claim 1 wherein said automatic sensitivity-range-control (SRC) channel comprises:
    an antenna acquisition gate configured to receive leakage signal samples from said receiver;
    a filter configured to receive signals from said antenna acquisition gate;
    an acquisition detector; and
    a gain control configured to receive signals from said filter to set a gain for said SRC channel that is below an acquisition threshold of said acquisition detector.

3. A radar altimeter according to claim 2 wherein said antenna acquisition gate is moved from zero out to a time directly proportional to an approximate maximum distance that antenna leakage path signals can travel, to determine a maximum gain which does not result in acquisition of leakage path signals.

4. A radar altimeter according to claim 3 wherein said radar altimeter is configured to determine the maximum gain only when the air vehicle has landing gears extended.

5. A radar altimeter according to claim 3 wherein said radar altimeter is configured to continuously determine the maximum gain when an altitude is greater than an altitude that is proportional to a maximum distance that leakage path signals can travel between said transmit antenna and said receive antenna.

6. A radar altimeter according to claim 1 wherein said automatic sensitivity-range-control (SRC) channel comprises an antenna acquisition gate and said at least one altitude processing channel comprises an altitude acquisition gate, said radar altimeter configured such that said antenna acquisition gate substantially duplicates a sample width and a range of sample times of said altitude acquisition gate.

7. A radar altimeter according to claim 1 wherein said at least one altitude processing channel comprises an acquisition channel comprising an altitude acquisition gate, said acquisition channel configured to adjust sample times of said altitude acquisition gate to acquire a reflected ground return.

8. A radar altimeter according to claim 7 wherein when said altitude acquisition gate is attempting to acquire a ground return at an altitude where leakage path signals may also be acquired, said acquisition channel is configured to reduce its gain to a level dependent on the altitude.

9. A radar altimeter according to claim 8 further comprising a processor and a memory, the gain level of said acquisition channel at each altitude sample time controlled by an altitude versus gain level table stored in said memory.

10. A radar altimeter according to claim 9 configured to dither a gain of said automatic sensitivity-range-control (SRC) channel to determine a maximum gain that does not result in an acquisition of leakage signals and store the gain in said memory.

11. A radar altimeter according to claim 10 wherein said automatic sensitivity-range-control (SRC) channel comprises an antenna acquisition gate, said radar altimeter configured to determine a maximum gain that does not result in an acquisition of leakage path signals for each range position of said antenna acquisition gate.

12. A radar altimeter according to claim 11 wherein the maximum gain for each position of said antenna acquisition gate is stored in the altitude versus gain level table in said memory.

13. A radar altimeter according to claim 12 wherein the maximum gain for each position of said antenna acquisition gate is adjusted to a lower gain upon start up of said radar altimeter, to compensate for aircraft configuration changes that could affect signals that are received by said radar altimeter since the altitude versus gain level table was stored.

14. A radar altimeter according to claim 12 where upon a startup of said radar altimeter, said radar altimeter is configured to adjust altitude versus gain level table values according to a change in aircraft configuration.

15. A radar altimeter according to claim 9 wherein said memory is a non-volatile memory.

16. A method for processing signals received by a radar altimeter comprising:
    receiving a radar signal reflected by the ground indicative of an altitude;
    receiving a leakage signal from a transmit antenna of the radar altimeter; and
    sensing an amplitude of the received leakage signals when an altitude determined by the radar altimeter is sufficient to separate received signals reflected from the ground from received leakage path signals.

17. A method according to claim 16 wherein the radar altimeter includes an automatic sensitivity-range-control (SRC) channel having an acquisition detector, said method further comprising setting a gain for the SRC channel that is below an acquisition threshold of the acquisition detector.

18. A method according to claim 16 wherein the radar altimeter includes an automatic sensitivity-range-control (SRC) channel having an antenna acquisition gate, said method further comprising repeatedly moving a sampling time of the antenna acquisition gate out from zero to a time proportional to an approximate a maximum distance that signals can propagate along a leakage path, to determine a maximum gain which does not result in acquisition of leakage signals.

19. A method according to claim 18 further comprising determining the maximum gain only when the air vehicle has landing gears extended.

20. A method according to claim 18 further comprising continuously determining the maximum gain when an altitude is greater than an altitude that is proportional to a maximum distance that leakage path signals can travel between a transmit antenna and a receive antenna of the radar altimeter.

21. A method according to claim 16 wherein the radar altimeter includes an automatic sensitivity-range-control (SRC) channel having an antenna acquisition gate and at least one altitude processing channel having an altitude acquisition gate, said method comprising duplicating a sample width and a range of sample times of the altitude acquisition gate with the antenna acquisition gate.

22. A method according to claim 16 wherein the radar altimeter includes at least one altitude processing channel having an altitude acquisition gate, said method comprising adjusting altitude acquisition gate to acquire a reflected ground return.

23. A method according to claim 22 comprising reducing a gain of the at least one altitude processing channel to a level dependent on the altitude when attempting to acquire a ground return at an altitude where leakage path signals may also be acquired.

24. A method according to claim 23 further comprising controlling the gain level utilizing a stored altitude versus gain level table.

25. A method according to claim 23 wherein the radar altimeter includes an automatic sensitivity-range-control (SRC) channel having an antenna acquisition gate, said method further comprising:
    dithering a gain level of the automatic sensitivity-range-control (SRC) channel to determine a maximum gain value that does not result in an acquisition of leakage path signals; and
    storing the maximum gain value.

26. A method according to claim 25 further comprising determining a maximum gain that does not result in an acquisition of leakage path signals for each position of the antenna acquisition gate.

27. A method according to claim 26 further comprising reducing the maximum gain for each position of the antenna acquisition gate upon start up of the radar altimeter, to compensate for aircraft configuration changes that could affect signals that are received by the radar altimeter.

28. An automatic sensitivity-range-control (SRC) circuit for a radar altimeter, said SRC circuit configured to receive signals from a receiver of the radar altimeter, said SRC circuit configured to sense an amplitude of signals propagated along a leakage path between transmit and receive antennas of the radar altimeter when an altitude is determined to be sufficient to separate received signals reflected from the ground from signals received from the leakage path.

29. An SRC circuit according to claim 28 comprising:
    an antenna acquisition gate configured to receive leakage path signal samples from the receiver;
    a filter configured to receive signals from said antenna acquisition gate;
    an acquisition detector; and
    a gain control configured to receive signals from said filter to set a gain for said SRC circuit that is below an acquisition threshold of said acquisition detector.

30. An SRC circuit according to claim 29 wherein said antenna acquisition gate is moved from zero out to a time directly proportional to an approximate maximum distance that leakage path signals can travel, to determine a maximum gain which does not result in acquisition of leakage path signals.

31. An SRC circuit according to claim 30 configured to continuously determine the maximum gain when an altitude is greater than an altitude that is proportional to a maximum distance that leakage path signals can travel between the transmit antenna and the receive antenna.

32. An SRC circuit according to claim 29 wherein said antenna acquisition gate substantially duplicates a sample width and a range of sample times of an altitude acquisition gate of the radar altimeter.

* * * * *